United States Patent
Kobayashi et al.

(10) Patent No.: US 9,269,969 B2
(45) Date of Patent: Feb. 23, 2016

(54) FUEL CELL STACK

(71) Applicant: Honda Motor Co., Ltd., Tokyo (JP)

(72) Inventors: Tsuyoshi Kobayashi, Utsunomiya (JP); Tadashi Nishiyama, Sakura (JP); Kimiharu Mizusaki, Utsunomiya (JP); Eri Terada, Utsunomiya (JP); Takashi Kuwayama, Utsunomiya (JP); Hiroaki Ohta, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 472 days.

(21) Appl. No.: 13/724,510

(22) Filed: Dec. 21, 2012

(65) Prior Publication Data

US 2013/0164646 A1 Jun. 27, 2013

(30) Foreign Application Priority Data

Dec. 21, 2011 (JP) .................................. 2011-279392
Jul. 26, 2012 (JP) .................................. 2012-165955

(51) Int. Cl.
*H01M 8/04* (2006.01)
*H01M 8/02* (2006.01)
*H01M 8/10* (2006.01)

(52) U.S. Cl.
CPC ........ *H01M 8/04067* (2013.01); *H01M 8/0267* (2013.01); *H01M 2008/1095* (2013.01); *Y02E 60/50* (2013.01)

(58) Field of Classification Search
CPC .................. H01M 8/04067; H01M 8/0267
See application file for complete search history.

(56) References Cited

U.S. PATENT DOCUMENTS

| 7,799,480 B2 | 9/2010 | Nishiyama et al. |
| 2004/0038110 A1 | 2/2004 | Reiser et al. |
| 2004/0157099 A1 * | 8/2004 | Kato et al. ...................... 429/26 |
| 2004/0265667 A1 | 12/2004 | Kato et al. |
| 2006/0024561 A1 * | 2/2006 | Sato et al. ...................... 429/38 |
| 2006/0110649 A1 * | 5/2006 | Nishiyama et al. ............. 429/38 |
| 2007/0231656 A1 * | 10/2007 | Andreas-Schott et al. ...... 429/34 |

FOREIGN PATENT DOCUMENTS

| JP | 3149716 B2 | 3/2001 |
| JP | 2005-285402 | 10/2005 |
| JP | 2006-40586 | 2/2006 |
| JP | 2006-147502 | 6/2006 |
| JP | 2008-146848 | 6/2008 |

(Continued)

OTHER PUBLICATIONS

Japanese Office Action for Application No. 2012-165955, 7 pages, dated Feb. 12, 2014.

*Primary Examiner* — Jeremiah Smith
(74) *Attorney, Agent, or Firm* — Nelson Mullins Riley & Scarborough LLP; Anthony A. Laurentano

(57) ABSTRACT

A fuel cell stack includes a terminal plate, an insulating member, and an end plate at one end of a stack body formed by stacking a plurality of power generation cells. A heat insulating member and the terminal plate are placed in a recess of the insulating member. The heat insulating member is formed by stacking metal plates and metal plates together alternately. The metal plate is formed by cutting the outer end of a first metal separator of the power generation cell into a frame shape and the metal plate is formed by cutting the outer end of a second metal separator of the power generation cell into a frame shape.

7 Claims, 6 Drawing Sheets

(56) References Cited

FOREIGN PATENT DOCUMENTS

| | | |
|---|---|---|
| JP | 2009-76211 | 4/2009 |
| JP | 4351431 | 10/2009 |
| JP | 2009-277521 | 11/2009 |
| JP | 4572062 | 10/2010 |
| JP | 4592940 | 12/2010 |
| JP | 4780283 | 9/2011 |
| JP | 4782419 | 9/2011 |

\* cited by examiner

)# FUEL CELL STACK

CROSS-REFERENCE TO RELATED APPLICATIONS

This application is based upon and claims the benefit of priority from Japanese Patent Applications No. 2011-279392 filed on Dec. 21, 2011 and No. 2012-165955 filed on Jul. 26, 2012, the contents all of which are incorporated herein by reference.

BACKGROUND OF THE INVENTION

1. Field of the Invention

The present invention relates to a fuel cell stack including a stack body formed by stacking power generation cells in a stacking direction, and terminal plates, insulating members, and end plates provided at both ends of the stack body in the stacking direction. Each of the power generation cells includes a membrane electrode assembly and a separator. The membrane electrode assembly includes a pair of electrodes and an electrolyte interposed between the electrodes.

2. Description of the Related Art

For example, a solid polymer electrolyte fuel cell employs a solid polymer electrolyte membrane. The solid polymer electrolyte membrane is a polymer ion exchange membrane. In the fuel cell, the solid polymer electrolyte membrane is interposed between an anode and a cathode each including an electrode catalyst layer of electrode catalyst and a gas diffusion layer of porous carbon to form a membrane electrode assembly (MEA). The membrane electrode assembly is sandwiched between separators (bipolar plates) to form a power generation cell. A predetermined number of the power generation cells are stacked together to form a fuel cell stack, e.g., mounted in a vehicle.

In some of power generation cells of such a fuel cell stack, in comparison with the other power generation cells, the temperature is decreased easily due to heat radiation to the outside. For example, in the power generation cells provided at ends of the fuel cell stack in the stacking direction (hereinafter also referred to as the "end power generation cells"), since a large amount of the heat is radiated to the outside, e.g., from the terminal plates and/or the end plates, or the like, the decrease in the temperature is significant.

In this regard, for example, a fuel cell stack disclosed in Japanese Laid-Open Patent Publication No. 2009-277521 (hereinafter referred to as conventional technique) is known. As shown in FIG. 6, the fuel cell stack includes a stack body 1 formed by stacking a plurality of unit cells, a pair of current collecting plates 2a, 2c provided on both sides of the stack body 1, a pair of end plates 3a, 3c provided outside the current collecting plates 2a, 2c, a plurality of elastic members 4 provided outside the current collecting plates 2a, 2c to apply pressure to components between the current collecting plates 2a, 2c, and heat insulating members 5 provided around the elastic members 4 to cover the elastic members 4.

SUMMARY OF THE INVENTION

However, in the conventional technique, though the heat insulating members 5 are used, significant heat tends to be radiated from the outer ends of the current collecting plates 2a, 2c and the end plates 3a, 3c. Thus, in particular, the temperature of the end cells of the stack body 1 cannot be kept warm sufficiently. For example, since condensed water is produced by condensation, the power generation performance is degraded.

The present invention has been made to solve the problem of this type, and an object of the present invention is to provide a fuel cell stack having simple structure in which it is possible to reliably prevent the decrease in the temperature of end cells, and the desired power generation performance is maintained.

The present invention relates to a fuel cell stack including a stack body formed by stacking power generation cells in a stacking direction, and terminal plates, insulating members, and end plates provided at both ends of the stack body in the stacking direction. Each of the power generation cells includes a membrane electrode assembly and a separator. The membrane electrode assembly includes a pair of electrodes and an electrolyte interposed between the electrodes.

In the fuel cell stack, at least one of the insulating members has a recess at an end opened toward the stack body, and a heat insulating member and the terminal plate are placed in the recess.

Further, in the present invention, at least one of the insulating members has a recess at an end opened toward the stack body, and a heat insulating member and the terminal plate are placed in the recess. The heat insulating member at least includes first heat insulating members and second heat insulating members made of different materials, and the first heat insulating members and the second heat insulating members are stacked together alternately.

In the present invention, the heat insulating member and the terminal plate are placed in the recess of the insulating member. Thus, heat radiation from the outer ends of the heat insulating member and the terminal plate can be suppressed suitably. Accordingly, with simple structure, the decrease in the temperature of the power generation cell provided at the end of the stack body is suppressed reliably, and the desired power generation performance can be maintained. Further, no sealing structure is required in the heat insulating member. Accordingly, structure is simplified, and cost reduction is achieved easily.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
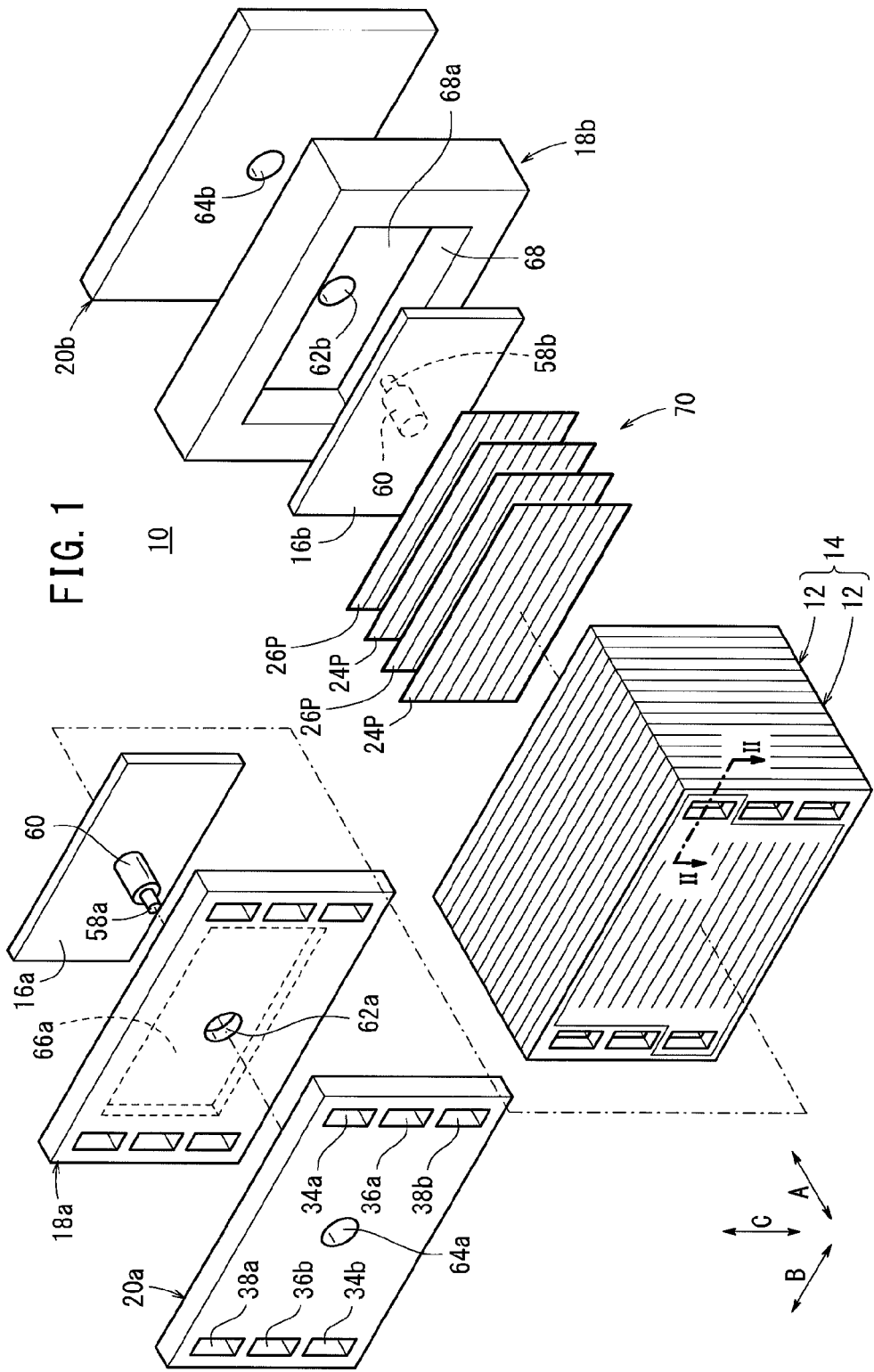
FIG. 1 is a partially exploded perspective view schematically showing a fuel cell stack according to a first embodiment of the present invention.
Figure 2:
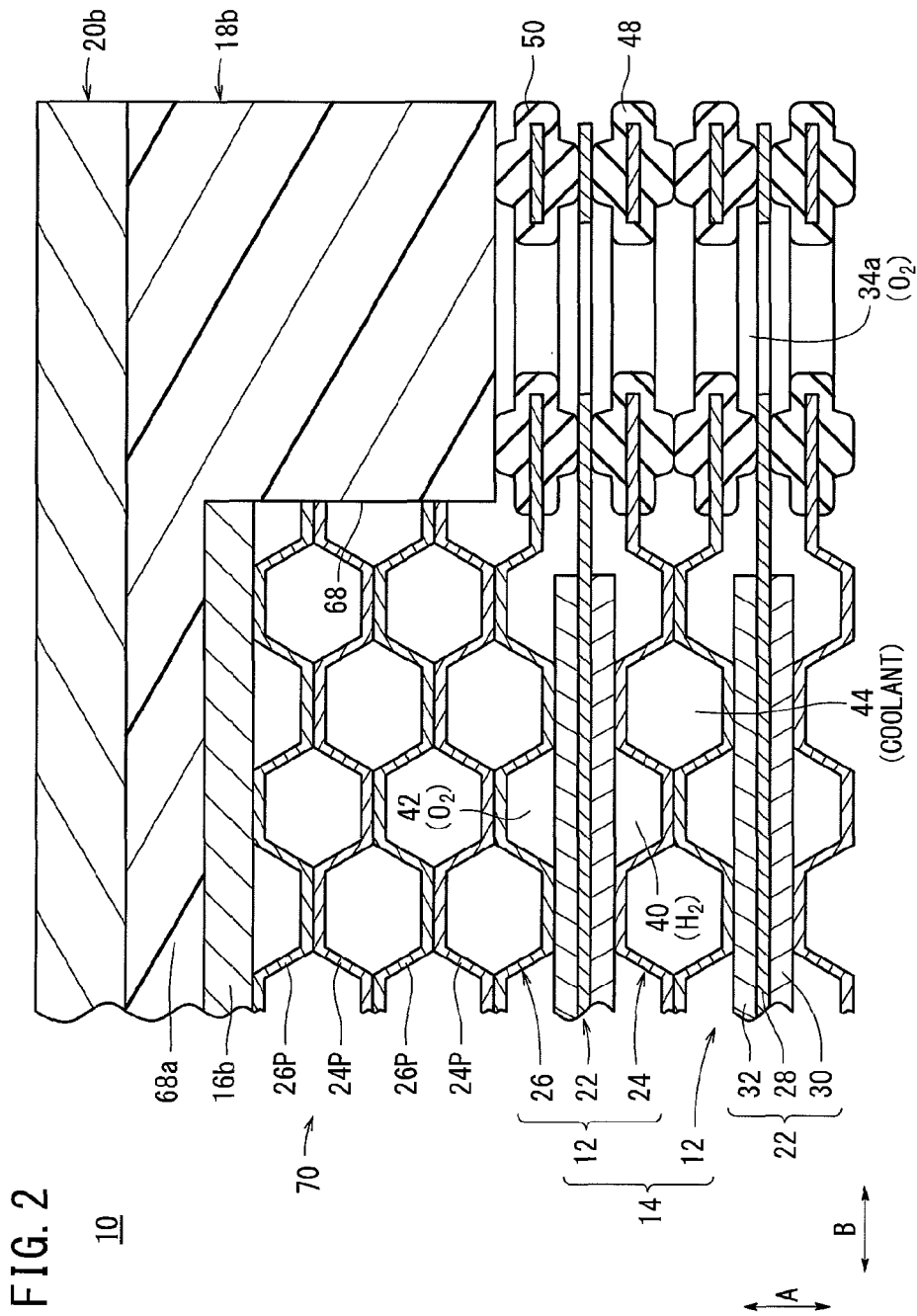
FIG. 2 is a cross sectional view showing the fuel cell stack, taken along a line II-II in FIG. 1.

As shown in FIGS. 1 and 2, a fuel cell stack 10 according to a first embodiment of the present invention includes a stack body 14 formed by stacking a plurality of power generation cells 12 in a horizontal direction indicated by an arrow A. As shown in FIG. 1, at one end of the stack body 14 in the direction indicated by the arrow A, a terminal plate 16a is provided. An insulating plate (insulating member) 18a is provided outside the terminal plate 16a. An end plate 20a is provided outside the insulating plate 18a. As shown in FIGS. 1 and 2, at the other end of the stack body 14 in the stacking direction, a terminal plate 16b is provided. An insulating member 18b is provided outside the terminal plate 16b. An end plate 20b is provided outside the insulating member 18b.

Components of the fuel cell stack 10 are held together by a box-shaped casing (not shown) including the end plates 20a, 20b, e.g., each having a rectangular shape. Alternatively, components between the end plates 20a, 20b are tightened together by a plurality of tie-rods (not shown) extending in the direction indicated by the arrow A.

Figure 3:
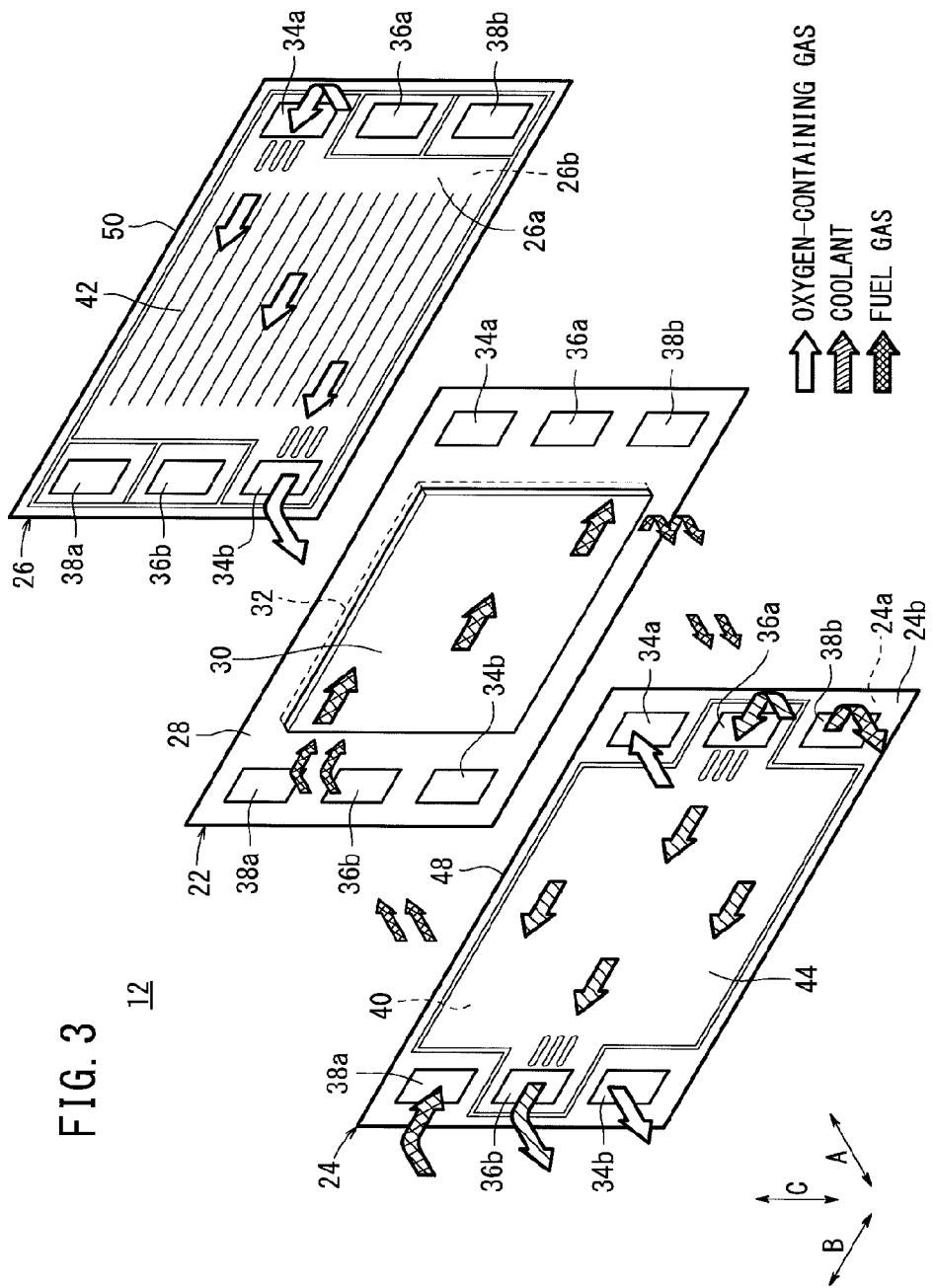
FIG. 3 is an exploded perspective view showing a power generation cell of the fuel cell stack.

As shown in FIGS. 2 and 3, each of the power generation cells 12 includes a membrane electrode assembly 22 and a first metal separator 24 and a second metal separator 26 sandwiching the membrane electrode assembly 22. For example, the first metal separator 24 and the second metal separator 26 are formed by corrugating thin metal plates formed by pressure forming. For example, the thin metal plates are steel plates, stainless steel plates, aluminum plates, plated steel sheets, or electrically conductive metal plates having anti-corrosive surfaces by surface treatment. Instead of the first and second metal separators 24, 26, for example, carbon separators may be used.

The membrane electrode assembly 22 includes an anode 30, and a cathode 32, and a solid polymer electrolyte membrane 28 interposed between the anode 30 and the cathode 32. The solid polymer electrolyte membrane 28 is formed by impregnating a thin membrane of perfluorosulfonic acid with water, for example. The surface area (plane surface size) of the solid polymer electrolyte membrane 28 is larger than the surface areas (plane surface sizes) of the anode 30 and the cathode 32.

In the membrane electrode assembly 22, the surface area (plane surface size) of the anode 30 may be different from the surface area (plane surface size) of the cathode 32 as a so-called stepped type MEA.

Each of the anode 30 and the cathode 32 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 30 and the electrode catalyst layer of the cathode 32 are fixed to both surfaces of the solid polymer electrolyte membrane 28, respectively.

At one end of the power generation cell 12 in a horizontal direction indicated by an arrow B in FIG. 3, an oxygen-containing gas supply passage 34a for supplying an oxygen-containing gas, a coolant supply passage 36a for supplying a coolant, and a fuel gas discharge passage 38b for discharging a fuel gas such as a hydrogen containing gas are arranged in a vertical direction indicated by an arrow C. The oxygen-containing gas supply passage 34a, the coolant supply passage 36a, and the fuel gas discharge passage 38b extend through the power generation cell 12 in the stacking direction indicated by the arrow A.

At the other end of the power generation cell 12 in the direction indicated by the arrow B, a fuel gas supply passage 38a for supplying a fuel gas, a coolant discharge passage 36b for discharging the coolant, and an oxygen-containing gas discharge passage 34b for discharging the oxygen-containing gas are arranged in the direction indicated by the arrow C. The fuel gas supply passage 38a, the coolant discharge passage 36b, and the oxygen-containing gas discharge passage 34b extend through the power generation cell 12 in the direction indicated by the arrow A.

The first metal separator 24 has a fuel gas flow field 40 on its surface 24a facing the membrane electrode assembly 22. For example, the fuel gas flow field 40 extends in the direction indicated by the arrow B. The fuel gas flow field 40 is connected to the fuel gas supply passage 38a and the fuel gas discharge passage 38b.

The second metal separator 26 has an oxygen-containing gas flow field 42 on its surface 26a facing the membrane electrode assembly 22. For example, the oxygen-containing gas flow field 42 extends in the direction indicated by the arrow B. The oxygen-containing gas flow field 42 is connected to the oxygen-containing gas supply passage 34a and the oxygen-containing gas discharge passage 34b.

A coolant flow field 44 is formed between a surface 24b of the first metal separator 24 and a surface 26b of the second metal separator 26 that are adjacent to each other. The coolant flow field 44 is connected between the coolant supply passage 36a and the coolant discharge passage 36b. The coolant flow field 44 is formed when the back surface of the fuel gas flow field 40 and the back surface of the oxygen-containing gas flow field 42 are stacked together.

As shown in FIGS. 2 and 3, a first seal member 48 is formed integrally with the surfaces 24a, 24b of the first metal separator 24, around the outer end of the first metal separator 24. A second seal member 50 is formed integrally with the surfaces 26a, 26b of the second metal separator 26, around the outer end of the second metal separator 26.

For example, each of the first seal member 48 and the second seal member 50 is an elastic seal member made of seal material, cushion material, or packing material such as an EPDM (Ethylene Propylene Diene Monomer) rubber, an NBR (nitrile butadiene rubber), a fluoro rubber, a silicone rubber, a fluorosilicone rubber, a Butyl rubber, a natural rubber, a styrene rubber, a chloroprene rubber, or an acrylic rubber.

As shown in FIG. 1, current collection terminals 58a, 58b are provided at substantially the centers of the terminal plates 16a, 16b. The current collection terminals 58a, 58b extend outwardly in the stacking direction. The terminals 58a, 58b are inserted into respective insulating cylindrical bodies 60, and pass through holes 62a, 62b of the insulating plate 18a and the insulating member 18b, and holes 64a, 64b of the end plates 20a, 20b to the outside of the end plates 20a, 20b.

The insulating plate 18a and the insulating member 18b are made of insulating material such as polycarbonate (PC) or phenolic resin. The insulating plate 18a integrally includes a rectangular recess 66a at the center thereof. A hole 62a is formed at a substantially central portion of the rectangular recess 66a. The terminal plate 16a is placed in the recess 66a. A terminal 58a of the terminal plate 16a and the insulating cylindrical body 60 around the terminal 58a are inserted into the hole 62a.

The insulating member 18b is thicker than the insulating plate 18a, and integrally includes a recess 68 at an end opened toward the stack body 14. A hole 62b is formed at a substantially central portion of a bottom surface 68a of the recess 68. A heat insulating member 70 and the terminal plate 16b are placed in the recess 68, and the terminal 58b of the terminal plate 16b and the insulating cylindrical body 60 around the terminal 58b are inserted into the hole 62b.

The terminal plate 16b is placed to contact the bottom surface 68a of the recess 68. However, the present invention is not limited in this respect. The heat insulating member 70 may be provided to contact the bottom surface 68a, and the terminal plate 16b may be provided to contact a surface of the heat insulating member 70 opposite to the bottom surface 68a. In this case, a hole is formed at the center of the heat insulating member 70 for inserting the terminal 58b and the insulating cylindrical body 60 around the terminal 58b into the hole.

The heat insulating member 70 is formed by stacking, e.g., two pairs of corrugated metal plates 24P and corrugated metal plates 26P alternately. Each of the corrugated metal plates 24P is formed by cutting the outer end of the first metal separator 24 into a frame shape, and each of the corrugated metal plates 26P is formed by cutting the outer end of the second metal separator 26 into a frame shape. In the heat insulating member 70, by contacts of the metal plates 24P, 26P, heat insulating spaces are formed between the metal plates 24P, 26P. In the case where the power generation cell 12 is made up of three different types of separators, the three separators may be stacked together alternately to form the heat insulating member 70.

Specifically, the outer end of the first metal separator 24 around the inner end of the first seal member 48 should be cut to form the metal plate 24P. The outer shape of this metal plate 24P has the same size as the inner shape of the recess 68 of the insulating member 18b. The outer end of the second metal separator 26 around the inner end of the second seal member 50 should be cut to form the metal plate 26P. The outer shape of this metal plate 26P has the same size as the inner shape of the recess 68 of the insulating member 18b.

The heat insulating member 70 may be formed by stacking one pair of the metal plates 24P, 26P together or formed by stacking three pairs of the metal plates 24P, 26P together. Alternatively, a plurality of the single type of metal plates 24P may be stacked together to form the heat insulating member 70, or a plurality of the single type of metal plates 26P may be stacked together to form the heat insulating member 70. Further, instead of using the separators for power generation cells, dedicated metal separators in a corrugated shape as end metal separators may be used.

Further, as long as the heat insulating member 70 has air holes and electrical conductivity, the heat insulating member 70 may adopt any structure. For example, the heat insulating member 70 may be made of any of formed metal having electrical conductivity, honeycomb-shaped metal (honeycomb member) having electrical conductivity, and porous carbon (e.g., carbon paper). The heat insulating member 70 may be in a form of a single sheet, or may be in a form of a plurality of sheets that are stacked together.

As shown in FIG. 2, the second seal member 50 of the second metal separator 26 provided at the end of the stack body 14 in the stacking direction adjacent to the insulating member 18b contacts the frame shaped end surface of the insulating member 18b. The second seal member 50 and the insulating member 18b provide a sealing function for preventing leakage of the fuel gas, the oxygen-containing gas, and the coolant in the stack body 14.

Operation of the fuel cell stack 10 will be described below.

Firstly, as shown in FIG. 1, at the end plate 20a, an oxygen-containing gas is supplied to the oxygen-containing gas supply passage 34a. At the end plate 20a, a fuel gas such as a hydrogen-containing gas is supplied to the fuel gas supply passage 38a. Further, at the end plate 20a, a coolant such as pure water, ethylene glycol or oil is supplied to the coolant supply passage 36a.

As shown in FIG. 3, the oxygen-containing gas from the oxygen-containing gas supply passage 34a flows into the oxygen-containing gas flow field 42 of the second metal separator 26. The oxygen-containing gas moves in the direction indicated by the arrow B along the oxygen-containing gas flow field 42, and the oxygen-containing gas is supplied to the cathode 32 of the membrane electrode assembly 22 for inducing an electrochemical reaction at the cathode 32.

In the meanwhile, the fuel gas from the fuel gas supply passage 38a flows into the fuel gas flow field 40 of the first metal separator 24. The fuel gas flows in the direction indicated by the arrow B along the fuel gas flow field 40, and the fuel gas is supplied to the anode 30 of the membrane electrode assembly 22 for inducing an electrochemical reaction at the anode 30.

Thus, in each of the membrane electrode assemblies 22, the oxygen-containing gas supplied to the cathode 32, and the fuel gas supplied to the anode 30 are partially consumed in the electrochemical reactions at catalyst layers of the cathode 32 and the anode 30 for generating electricity.

Then, the oxygen-containing gas partially consumed at the cathode 32 flows along the oxygen-containing gas discharge passage 34b, and the oxygen-containing gas is discharged in the direction indicated by the arrow A. Likewise, the fuel gas partially consumed at the anode 30 flows along the fuel gas discharge passage 38b, and the fuel gas is discharged in the direction indicated by the arrow A.

The coolant supplied to the coolant supply passage 36a flows into the coolant flow field 44 between the first metal separator 24 and the second metal separator 26, and the coolant flows along the coolant flow field 44 in the direction indicated by the arrow B. After the coolant cools the membrane electrode assembly 22, the coolant is discharged into the coolant discharge passage 36b.

In the first embodiment, as shown in FIG. 2, the recess 68 is formed in the insulating member 18b, and the heat insulating member 70 and the terminal plate 16b are placed in the recess 68. Thus, heat radiation from the outer end of the heat insulating member 70 and the terminal plate 16b can be suppressed suitably. Accordingly, with simple structure, the decrease in the temperature of the power generation cell 12 provided at the end of the stack body 14 is suppressed reliably, and the desired power generation performance can be maintained.

Further, the heat insulating member 70 is formed by providing the metal plates 24P and the metal plates 26P alternately. Each of the metal plates 24P is formed by cutting the outer end of the first metal separator 24 into the frame shape, and each of the metal plates 26P is formed by cutting the outer end of the second metal separator 26 into the frame shape. Further, the second seal member 50 of the second metal separator 26 provided at one end of the stack body 14 in the stacking direction contacts the end surface of the insulating member 18b.

In the structure, the second seal member 50 and the insulating member 18b provide the desired sealing function, and no sealing structure is required in the heat insulating member 70. Accordingly, structure is simplified, and cost reduction is achieved easily and economically.

In the first embodiment, the heat insulating member 70 may be provided at one end of the fuel cell stack 10 in the stacking direction, or may be provided at both ends of the fuel cell stack 10 in the stacking direction. Also in a second embodiment described later, the heat insulating member may be provided at one end of the fuel cell stack in the stacking direction, or may be provided at both ends of the fuel cell stack in the stacking direction.

Figure 4:
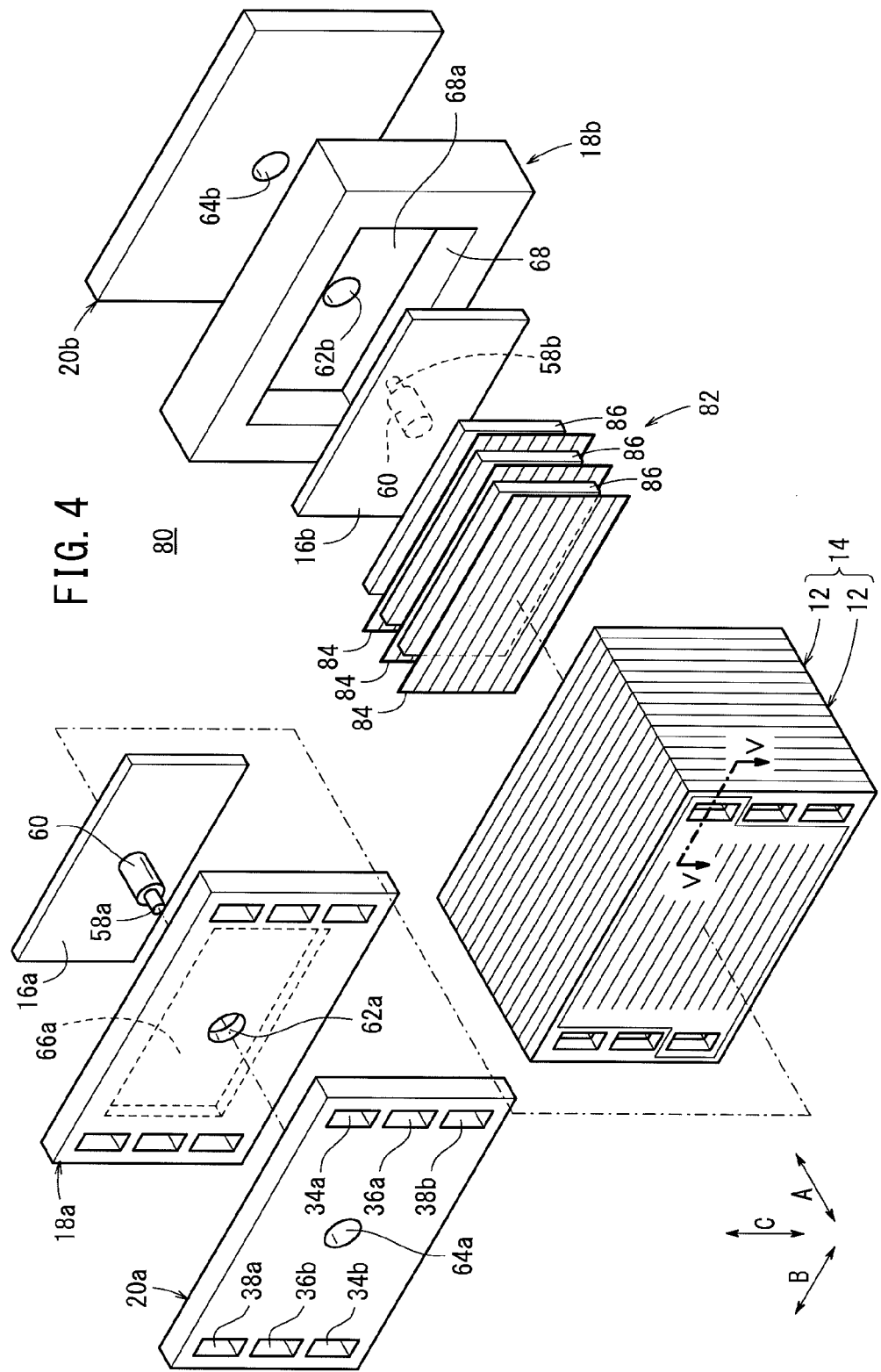
FIG. 4 is a partially exploded perspective view schematically showing a fuel cell stack according to a second embodiment of the present invention.
Figure 5:
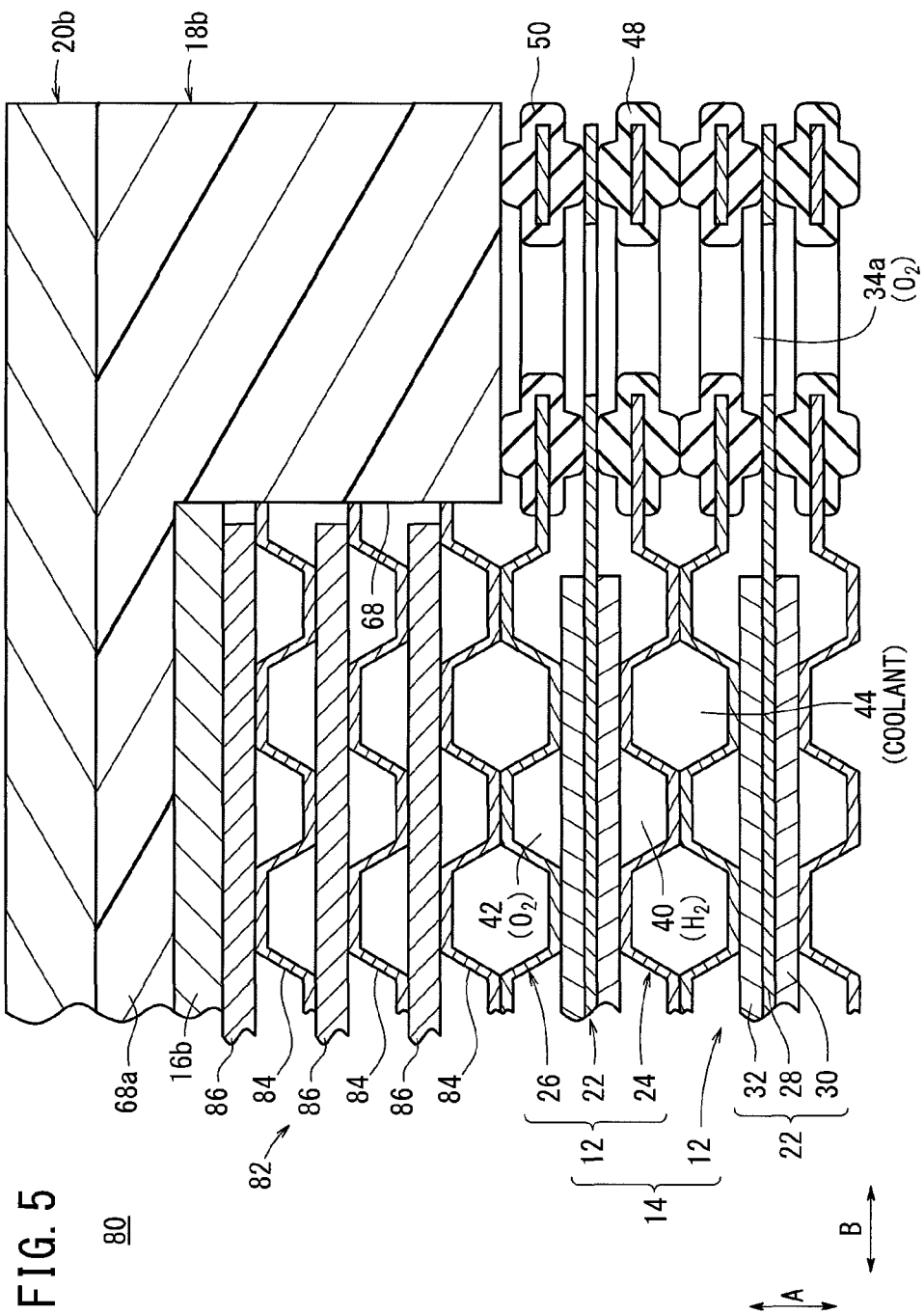
FIG. 5 is a cross sectional view showing the fuel cell stack, taken along a line V-V in FIG. 4.
Figure 6:
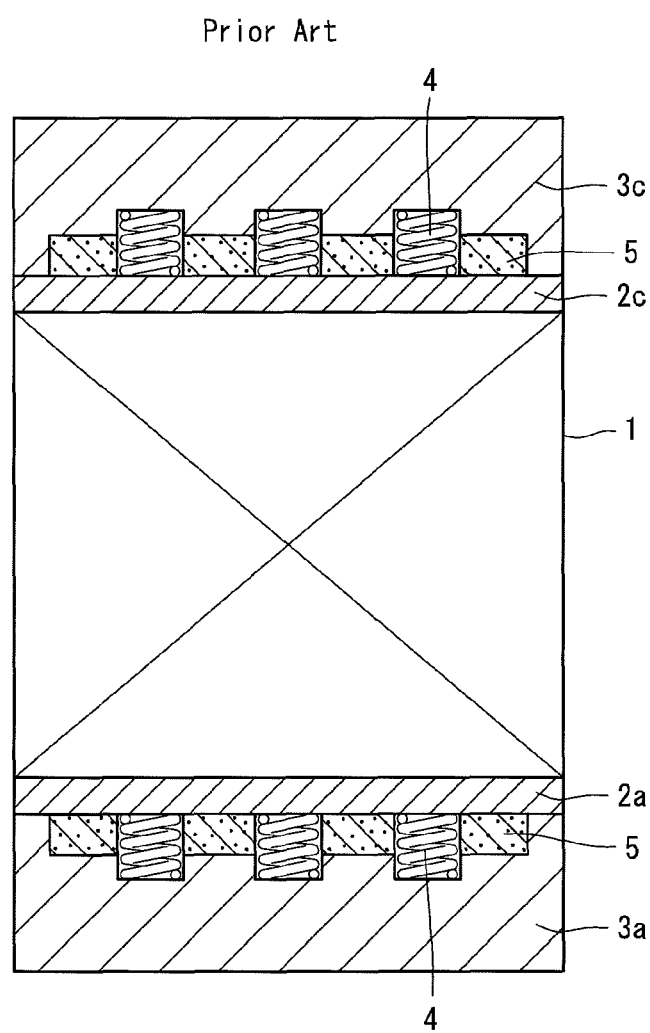
FIG. 6 is a view showing a fuel cell stack disclosed in conventional technique.

FIGS. 4 and 5 show a fuel cell stack 80 according to the second embodiment of the present invention. The constituent elements that are identical to those of the fuel cell stack 10 according to the first embodiment are labeled with the same reference numerals, and descriptions thereof are omitted.

The fuel cell stack 80 includes a heat insulating member 82 instead of the above heat insulating member 70. The heat insulating member 82 includes at least first heat insulating members 84 and second heat insulating members 86. The first heat insulating members 84 and the second heat insulating members 86 are made of different materials. The first heat insulating members 84 and second heat insulating members 86 are stacked together alternately.

For example, the first heat insulating member 84 is made of a metal plate. At least one of the metal plates 24P, 26P can be used for this metal plate. Any member can be used for the second heat insulating member 86 as long as it has heat insulating and electrically conductive properties. For example, a carbon plate made of an electrically conductive and inorganic material can be used for the second heat insulating member 86. The second heat insulating member 86, however, is not limited to a carbon plate, as long as a plate-like inorganic member made of an electrically conductive material is used. The outer shape of the second heat insulating member 86 is smaller than the outer shape of the first heat insulating member 84 (see FIG. 5).

In the second embodiment, the heat insulating member 82 is provided in the recess 68 of the insulating member 18b. The heat insulating member 82 includes the first heat insulating members 84 and the second heat insulating members 86 made of different materials. The first heat insulating members 84 and the second heat insulating member 86 are stacked together alternately.

In the structure, thermal boundary resistance is produced at the contact surface between the first heat insulating member 84 and the second heat insulating member 86 made of different materials, and improvement in the heat insulating performance is achieved suitably. Thus, even if the first heat insulating member 84 and the second heat insulating member 86 are thin, the desired electrical conductivity and the desired heat insulating performance can be achieved reliably. With the simple and contact structure, the same advantages as in the case of the first embodiment are obtained. For example, the decrease in the temperature of the power generation cell 12 provided at the end of the stack body 14 is prevented reliably, and the desired power generation performance is maintained.

As long as the first heat insulating member 84 and the second heat insulating member 86 are made of different materials, various combinations of the first heat insulating member 84 and the second heat insulating member 86 can be adopted. Further, the number and combination of the stacked first heat insulating members 84 and the stacked second heat insulating members 86 can be determined arbitrarily. Moreover, the second heat insulating member 86 may be formed to have a corrugated plate shape instead of a flat plate shape.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack comprising:
a stack body formed by stacking power generation cells in a stacking direction, the power generation cells each including a membrane electrode assembly and a separator, the membrane electrode assembly including a pair of electrodes and an electrolyte interposed between the electrodes;
terminal plates, insulating members, and end plates provided at both ends of the stack body in the stacking direction;
wherein at least one of the insulating members has a recess at an end opened toward the stack body; and
a heat insulating member and the terminal plate are placed in the recess, wherein the heat insulating member includes a corrugated metal plate, and wherein the recess is sized and dimensioned to completely mount the terminal plate and the heat insulating member.

2. The fuel cell stack according to claim 1, wherein the separator is formed by corrugating a thin metal plate; and
the heat insulating member is formed by cutting an outer end of the separator of the stack body into a frame shape.

3. The fuel cell stack according to claim 1, wherein the heat insulating member includes any of formed metal having electrical conductivity, a honeycomb member having electrical conductivity, and porous carbon.

4. The fuel cell stack according to claim 1, wherein the heat insulating member comprises a plurality of first heat insulating members and a plurality of second heat insulating members, wherein the plurality of first heat insulating members are made of a material that is different than a material of the plurality of second heat insulating members; and
the first heat insulating members and the second heat insulating members are stacked together alternately.

5. The fuel cell stack according to claim 1, wherein the terminal plate is provided to contact the bottom surface of the recess.

6. A fuel cell stack comprising:
a stack body formed by stacking power generation cells in a stacking direction, the power generation cells each including a membrane electrode assembly and a separator, the membrane electrode assembly including a pair of electrodes and an electrolyte interposed between the electrodes; and
terminal plates, insulating members, and end plates provided at both ends of the stack body in the stacking direction;
wherein at least one of the insulating members has a recess at an end opened toward the stack body and a heat insulating member and the terminal plate are placed in the recess, wherein the heat insulating member includes a corrugated metal plate, and wherein the recess is sized and dimensioned to completely mount the terminal plate and the heat insulating member; and
the heat insulating member at least includes a plurality of first heat insulating members and a plurality of second heat insulating members, wherein the plurality of first heat insulating members are made of a material that is different than a material of the plurality of second insulating members; and
the plurality of first heat insulating members and the plurality of second heat insulating members are stacked together alternately.

7. The fuel cell stack according to claim 6, wherein each of the plurality of first heat insulating members is made of a metal plate, and each of the plurality of second heat insulating members is made of a carbon plate.

* * * * *